May 17, 1960 W. M. BEEBE 2,936,617
SWIVEL MOUNTED AIRCRAFT INSTRUMENTS
Filed Jan. 20, 1955 2 Sheets-Sheet 1
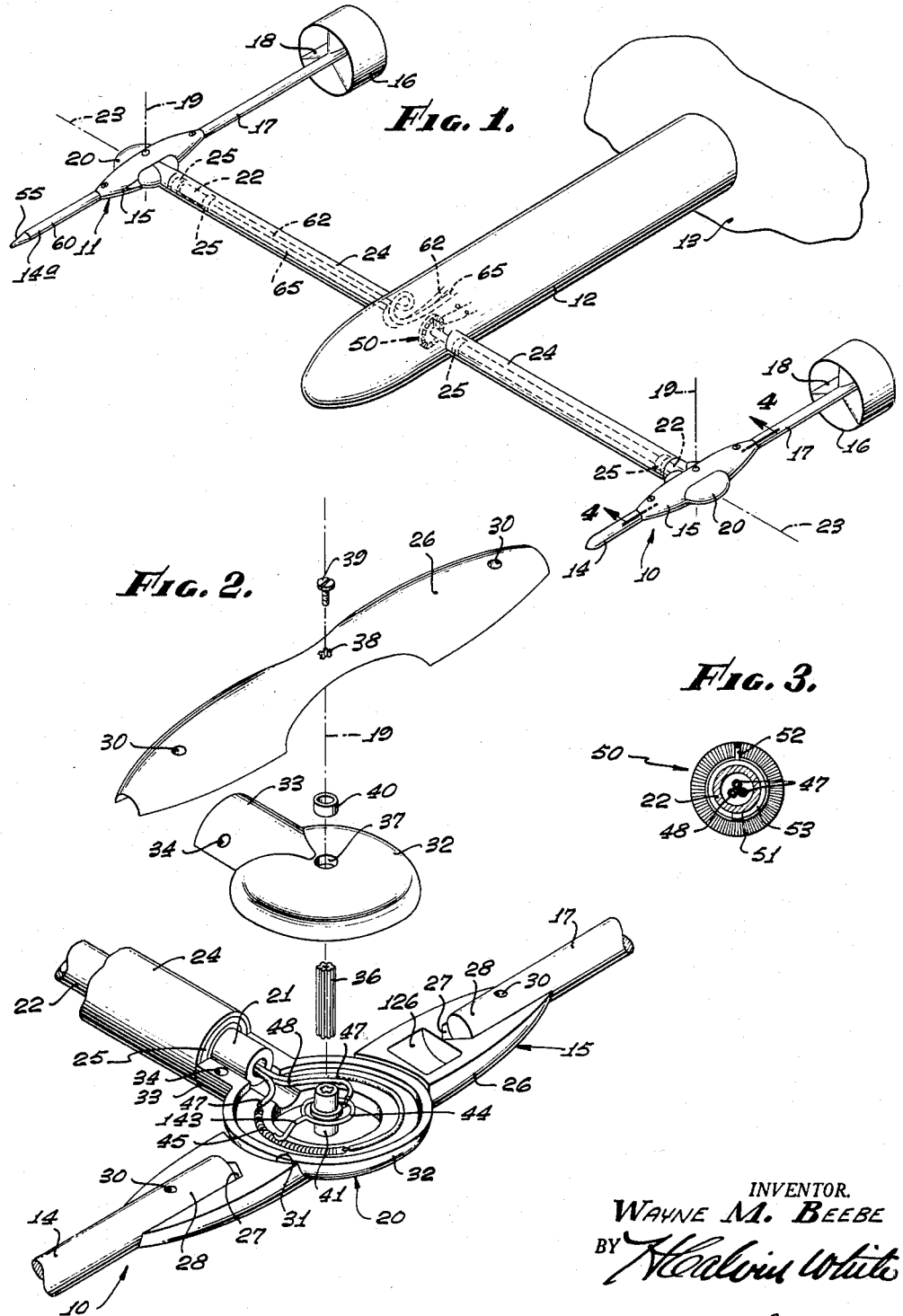
INVENTOR.
WAYNE M. BEEBE
BY
ATTORNEY.

May 17, 1960 W. M. BEEBE 2,936,617
SWIVEL MOUNTED AIRCRAFT INSTRUMENTS
Filed Jan. 20, 1955 2 Sheets-Sheet 2
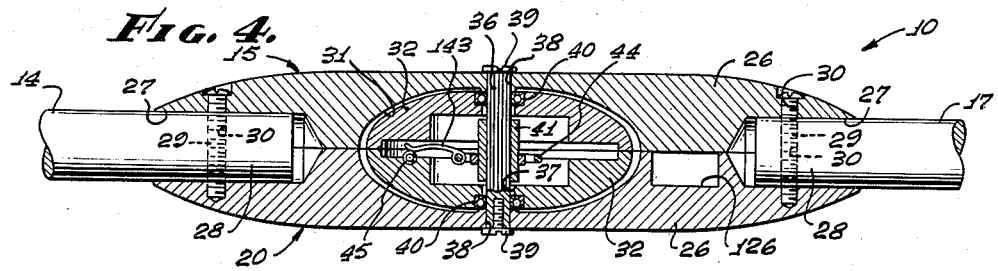
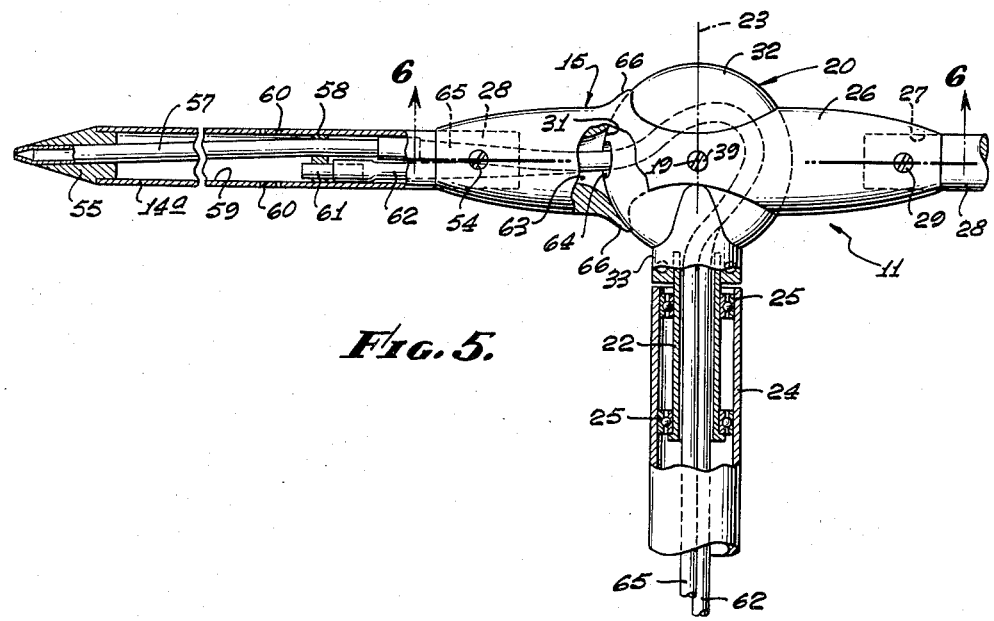
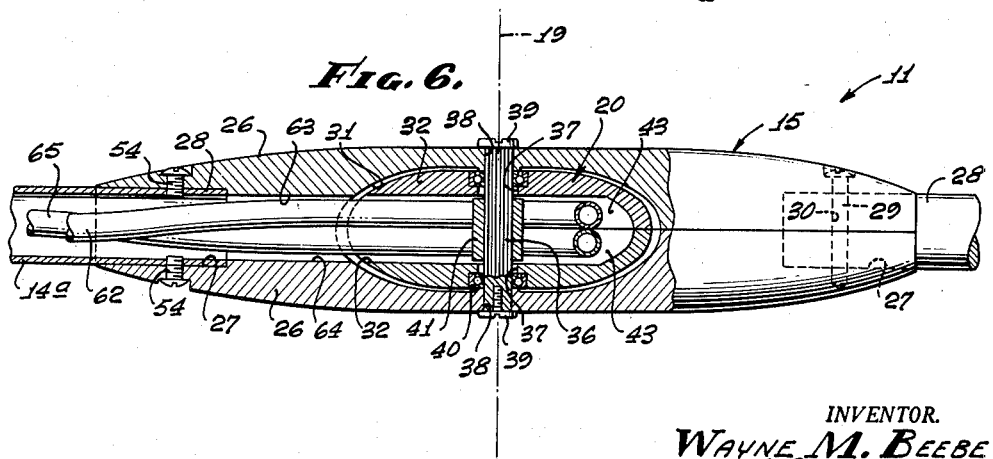
INVENTOR.
WAYNE M. BEEBE
BY
ATTORNEY.

United States Patent Office 2,936,617
Patented May 17, 1960

2,936,617

SWIVEL MOUNTED AIRCRAFT INSTRUMENTS

Wayne M. Beebe, Pasadena, Calif., assignor to Task Corporation, Pasadena, Calif., a corporation of California Application January 20, 1955, Serial No. 482,934

10 Claims. (Cl. 73—178)

This invention relates generally to instruments adapted to be carried by and outboard of moving aircraft, and more particularly has to do with wind sensitive instruments of the type used for measuring wind direction relative to the direction of aircraft bearing and for head measurements of the wind, including velocity and static pressure heads. Since wind velocity may be properly described as having both direction and magnitude, the concept of wind velocity relative to moving aircraft refers to the direction and magnitude of the wind as it appears to an observer on the aircraft, and represents the vector sum of absolute wind velocity and wind velocity arising solely by virtue of aircraft movement in the direction of aircraft bearing. As a result, the direction of wind velocity relative to a moving aircraft lies at an angle to aircraft bearing, or broadly at an angle relative to the aircraft, whenever absolute wind velocity exists and lies in a direction other than that of aircraft bearing.

Wind directed instruments have been built and used in the past for obtaining knowledge as to the magnitude and direction of wind velocity relative to a moving aircraft; however, insofar as I am aware such instruments lack the ability to deviate more than a limited angular amount from the direction of aircraft bearing. Indeed, greater deviation has not generally been needed, since flying speeds of the vast majority of modern aircraft are substantially greater than absolute wind speed, so that even assuming the latter were directed at right angles to the direction of aircraft bearing, the resultant wind velocity relative to the aircraft would usually not be directed more than about 20 degrees maximum from aircraft bearing.

As used in certain types of modern aircraft, however, which fly or take off at comparatively low speeds, such instruments fail to give accurate information as to the direction and magnitude of wind velocity relative to such aircraft, by virtue of their inability to angularly deviate sufficiently so as to align themselves in the direction of resultant wind velocity. By way of example, the usefulness and reliability of this type of instrument is definitely limited in its application to aircraft which take-off vertically at initially very low speeds, since assuming a high, horizontal, absolute wind velocity and a low, vertical, aircraft velocity at take-off, the instrument would have to deviate more than 20° from the vertical to align itself with resultant wind velocity relative to the aircraft. Other types of aircraft which fly at low speeds, such as light, low power aircraft, cannot make advantageous use of such instruments for similar reasons.

The present invention has as its major object the provision of a wind sensitive aircraft instrument capable of wide deviation from the direction of aircraft bearing no matter how low aircraft velocity might be, in order to facilitate obtaining and transmitting to aircraft recording instruments information, the accuracy of which is dependent upon alignment of the instrument in the direction of wind velocity relative to aircraft bearing. For this purpose there is provided a vane and a vane support assembly arranged in such a way as to enable the vane to be wind directed at wide angles, the vane and vane support assembly carrying the necessary sensing instrumentation and providing for the transmission of information to the aircraft. More specifically, a tubular vane support is arranged to project outward from a portion of the aircraft surface and to rotate about its axis, providing for 360° vane rotation in a first plane perpendicular to that axis. The vane body is connected to the outer end of the swivel tube to rotate through at least a 60° arc about an axis extending at right angles to the tube axis, which rotation together with tube rotation allows the vane to be wind directed through wide angles, except for limitations imposed by the connection between the vane and tube.

The latter connection comprises a hollow body on which the vane is pivotally mounted, the body being affixed to the end of the tube and extending into the vane body, for strength purposes. The necessary sensory instrumentation is conveniently carried in the hollow body, and may comprise, for example, a potentiometer connected between the vane and the hollow body to measure angular rotation of the vane relative to the tube, with electrical leads extending from the potentiometer through the tube to the aircraft. Similarly, another potentiometer may be connected between the opposite end of the tube and the fixed aircraft surface to measure tube rotation. It is also contemplated to mount a pitot tube in another similar vane body to convert wind velocity heads into air pressure conducted through flexible tubing passing through a similar hollow body and swivel tube to a recording instrument in the aircraft. In addition, static pressure tubing may be connected with a side inlet in the same vane body and led into the aircraft to a barometric gauge or to a gauge measuring total head.

The invention also contemplates supporting the swivel tube on a strut extending outward from the aircraft body, and preferably utilizing two vanes connected at the outer ends of a pair of swivel tubes projecting on opposite sides of the strut, one vane incorporating the pitot and static pressure instrumentation, and the other vane and tube carrying a potentiometer, as described.

Other features and objects of the invention, as well as the details of an illustrative embodiment, will appear more fully understood from the following description of the accompanying drawings, in which:

Fig. 1 is a perspective view of the wind sensitive instrument mounted on a portion of an aircraft;

Fig. 2 is an enlarged and exploded view of a portion of the instrument;

Fig. 3 is an enlarged elevation of a potentiometer carried by the instrument;

Fig. 4 is an elevational view taken in section of a fragmentary portion of the instrument on line 4—4 of Fig. 1;

Fig. 5 is a plan view partly in section of a wind velocity head and static head sensitive instrument; and Fig. 6 is an enlarged view taken in section of a fragmentary portion of the instrument shown in Fig. 5 and taken on line 6—6 thereof.

As shown in Fig. 1 of the drawings, a pair of wind directable vanes 10 and 11 are supported in spaced relation to and on opposite sides of a strut 12 projecting outward from a surface portion 13 of an aircraft, as shown. Each of the vanes comprises essentially an elongated nose section 14 projecting forward from a body portion 15, and a tail section including a cylindrical wind guided surface 16 carried on a central support 17 extending rearwardly from the body portion, and having radial struts 18 connecting each support 17 with surface 16.

Each vane is mounted for pivoting about an axis 19 on a hollow body 20, which is carried at the outer end 21 of a swivel tube 22 journaled for rotation about an axis 23 in a tubular support 24 projecting outward from the strut. Bearings 25 carried in the support tubes journal the swivel tubes for rotation, as described. To accomplish pivoting of the vane throughout arcs as large as possible, axes 19 and 23 desirably intersect and extend relatively perpendicularly, vane body 15 being supported on the hollow body 20 in such a way as to accommodate wide angle pivoting about axis 19, and rotation of the vane about axis 23 throughout 360° being made possible by the swivel tube structure 22.

Each of the vane bodies 15 includes upper and lower halves 26 formed generally to have smoothly curved exterior surfaces elongated between the nose and tail sections of the vanes, and including fore and aft openings 27 to receive respectively the ends 28 of the nose section 14 and the tail support section 17, as shown in Figs. 2 and 4. The latter are joined to the vane bodies by threaded members 29 which extend through drilled openings 30 in the connected elements. Vane body 15 contains a central transverse cut-out 31 formed in each of the halves 26 to receive the hollow body 20, which is spheroidal in shape, the cut-out portion 31 being slightly larger than and conforming in shape to the hollow body to provide a slight clearance therebetween allowing rotation of the vane about the hollow body.

The hollow body 20 includes upper and lower halves 32, each of which is integrally joined to a short semicircular tube section 33, the two sections being connected together by members not shown, passing through apertures 34 therein. When joined together, sections 33 envelop the outer end 21 of the swivel tube 22 to mount the hollow body and the vane 10 for rotation about axis 23 of the swivel tube. One vane body half 26 may be hollowed out, as at 126, to balance the vane for rotation about axes 19 and 23. To connect each vane to its hollow body 20, there is provided a central spline 36 projecting through upper and lower apertures 37 in body 20 and upper and lower splined openings 38 in the vane body halves 26, the latter being confined endwise on the spline by screws 39 threaded into opposite ends thereof. Bearings 40 journal the spline for rotation in the hollow body 20, the outer bearing races being mounted in bores in body 20 and the inner races being confined by shoulders formed on upper and lower walls of cut-out 31 to prevent axial displacement of the vane relative to the hollow body.

As shown in Figs. 1, 2 and 4, the hollow body 20 associated with vane 10 contains a potentiometer including a wiper arm 143 carried on a ring 44, which is in turn supported by the central sleeve 41, the wiper arm slidably contacting the curved slide wire 45 may comprise a large number of turns of high resistance wire extended through approximately a 60° arc, and having electrical leads 47 joined to its ends and led out of the hollow body through the swivel tube 22. A similar lead 48 is electrically connected to support ring 44, loosely curved in a flexible loop around sleeve 41, and led out through the swivel tube. It is of course contemplated that the position of the slide wire and wiper arm may be reversed, or that other electrical elements may be mounted in the hollow body to sense relative rotation by the vane about axis 19. The potentiometer elements and connections provided are readily seen to accommodate wide angular pivoting of vane 10 about axis 19, through at least a 60° arc.

A second potentiometer 50 of similar construction is mounted in the strut 12 to sense rotation of the swivel tube 22 about axis 23, the potentiometer typically comprising a circular slide wire 51 slidably contacted by a wiper arm 52 carried on a support ring 53 attached to swivel tube 22, as shown in Fig. 3. The two potentiometers are adapted to sense rotation of the vane 10 about axes 19 and 23 in order to transmit to appropriate recording instruments in the aircraft electrical signals corresponding in magnitude to the degree of rotation of the vane to indicate the direction of wind velocity relative to the direction of aircraft bearing. Since vane 10 is enabled to pivot through 360° about axis 23 and through at least a 60° arc about axis 19, it is obvious that the vane and potentiometers are well adapted to sense wide angular deviations of wind velocity relative to the direction of aircraft bearing.

As shown in Figs. 5 and 6, in which parts similar to those described in connection with Figs. 2 and 4 are given like numbers, the nose section 14a is shown to comprise a length of tubing the rear end of which is received within opening 27 formed in the upper and lower halves 26 of the hollow body 20, and joined to them by screws 54. To the opposite or forward end of section 14a there is connected a tapered plug 55 mounting at its forward end the tapered and apertured nose of a smaller pitot tube 57, which extends rearwardly through the plug 55 and through a transverse support 58 in the tubing 14a. Support 58 closes off a forward chamber 59 in the tube section 14a, and a series of small openings 60 are formed in the wall of chamber 59 to admit external atmospheric pressure. A small tube section 61 also extends through support 58 to communicate pressure in chamber 59 to flexible tubing 62 extending rearwardly into a chamber 63, which is formed in the vane body halves 26 and communicates with the interior of chamber 43 in hollow body 20 through an opening 64 in the wall thereof. A flexible tube 65 is also connected to the rearward end of pitot tube 57 and extends through opening 64 into the interior of the hollow body, from where both flexible tubes 62 and 65 are led around the sleeve 41 in a flexible loop and then passed through swivel tube 22 to strut 12 and subsequently to recording instruments in the aircraft.

It will be observed that the walls of chamber 63 are spaced apart sufficiently adjacent opening 64 to accommodate pivoting of vane 11 about axis 19 without interference between walls 63 and the flexible tubes at opening 64. For this purpose, the exterior surface of the vane body halves 26 are faired at points 66 to engage the cylindrical surface of tube 33 after pivoting of the vane through an angle wide enough to allow the pitot tube 57 to pivot as desired during normal flight conditions. In this connection, it will be observed that the flexible looping of the tubing in chamber 43 accommodates vane pivoting about axis 19 without binding of the tubing. In addition, flexible looping of the tubing inside the strut and torsional tubing deflection inside tubular support 24 accommodates pivoting of vane 11 about axis 23 of the swivel tube, as shown in Fig. 1.

Pitot tube 57 is adapted to sense external velocity heads of wind, the direction of which lies at wide angles to the direction of aircraft bearing so as to transmit to recording instruments in the aircraft air pressures corresponding in magnitude to the velocity heads encountered during normal flight conditions. Similarly, static pressure in chamber 59 is communicated to aircraft instruments through tube 62.

By mounting the two vanes 10 and 11 at opposite sides of the strut in spaced relation to the aircraft surface 13, not only is independent pivoting of the vanes facilitated, but also the wind loading on the strut is substantially balanced, since both vanes react similarly to wind conditions. In addition, the use of a separate vane 11 for measuring pressures independently of angular displacement measuring vane 10, instead of combining their separate functions in one vane, frees vane 10 for very accurate pivoting in response to directional changes in incident wind velocity, since the resistance to vane pivoting offered by flexible pressure tubes 62 and 65 would have the effect of materially decreasing the sensitivity of vane 10 were the pressure tubes incorporated therein. The ability to sense direction is less critical for the pressure vane 11 because the accuracy of pressure measurement is not affected by vane misalignment relative to incident air flow, up to several degrees.

I claim:

1. A wind sensitive aircraft instrument assembly, comprising a vane adapted for self-alignment substantially in the direction of incident wind, support means mounting the vane for turning through a relatively wide angle relative to the aircraft in response to changes in relative wind direction, said means including a strut adapted for connection in outward extending relation with the aircraft, a swivel tube projecting away from the strut, means mounting the tube for free rotation about the tube axis and relative to the strut and a connection mounting the vane to the tube for relative vane rotation about an axis angled with respect to the tube axis, and other means operatively connected with the vane and extending through said tube for sensing at least one of a change in relative wind velocity at the vane and turning of the vane relative to the aircraft and for transmitting a signal through the tube and strut to the aircraft in response to said sensing.

2. A wind sensitive aircraft instrument assembly, comprising a vane adapted for self-alignment substantially in the direction of incident wind, support means mounting the vane for turning through a relatively wide angle relative to the aircraft in response to changes in relative wind direction, said means including a strut adapted for connection in outward extending relation with the aircraft, a swivel tube projecting away from the strut, means mounting the tube for free rotation about the tube axis and relative to the strut and a connection including a hollow body mounting the vane at the projecting end of the tube for relative vane rotation about an axis extending through the hollow body substantially normal to the tube axis, and other means operatively connected with the vane and extending within the hollow body and through the tube for sensing at least one of a change in relative wind velocity at the vane and turning of the vane relative to the aircraft and for transmitting a signal through the tube and strut to the aircraft in response to said sensing.

3. The invention as defined in claim 2 comprising a transducer within the hollow body for electrically signalling vane rotation about said vane axis.

4. The invention as defined in claim 3 comprising a line connected with the transducer and extending through the tube for transmitting the signal to the aircraft.

5. The invention as defined in claim 4 in which said transducer comprises an electrically energizable potentiometer having elements mounted for relative sliding movement in response to said vane rotation to change the electrical resistance of the potentiometer.

6. The invention as defined in claim 5 including a second transducer operatively connected with said tube and strut for electrically signalling tube rotation about the tube axis, and another line connected with the second transducer for transmitting the signal produced thereby through the strut to the aircraft.

7. The invention as defined in claim 5 in which said second transducer comprises another electrically energizable potentiometer having elements mounted for relative sliding movement in response to tube rotation to change the electrical resistance of the potentiometer.

8. The invention as defined in claim 2 comprising a pitot tube extending within the vane and through the swivel tube with the tube inlet at the vane surface for transmitting to the aircraft wind pressures corresponding in magnitude with wind velocity heads relative to and externally of said aircraft.

9. The invention as defined in claim 2 comprising pitot and static pressure tubes extending within the vane and through the swivel tube with the tube inlets at the vane surfaces for separately transmitting to the aircraft, wind pressures corresponding in magnitude with wind velocity heads and static air pressure conditions relative to and externally of said aircraft.

10. A wind sensitive aircraft instrument assembly, comprising a pair of vanes adapted for self-alignment substantially in the direction of incident wind, support means mounting the vanes for turning through relatively wide angles relative to the aircraft in response to changes in relative wind direction, said means including a strut adapted for connection in outward extending relation with the aircraft, a pair of separated swivel tubes projecting away from the strut, means mounting the tubes for free rotation about the tube axis and relative to the strut and connections respectively mounting the vanes to the tubes for relative vane rotation about axes extending substantially normal to the respective tube axes, and other means operatively connected with the vanes and extending through said tubes for sensing turning of one vane relative to said aircraft and magnitudinal changes in wind velocity at the other vane and for transmitting signals through the tubes and strut to the aircraft in response to said sensing.

References Cited in the file of this patent

UNITED STATES PATENTS

| | | |
|---|---|---|
| 1,332,810 | Danielson | Mar. 2, 1920 |
| 1,384,867 | Sperry | July 19, 1921 |
| 2,512,278 | Jones | June 20, 1950 |
| 2,554,634 | Paine | May 29, 1951 |
| 2,662,402 | Ince | Dec. 15, 1953 |